United States Patent
Nicolai et al.

(10) Patent No.: US 10,540,477 B2
(45) Date of Patent: Jan. 21, 2020

(54) SPACE MODELING LANGUAGE FOR THE GENERATION OF ENGINEERING DESIGNS

(71) Applicants: Mike Nicolai, Zonhoven (BE); Luca Salemio, Leuven (BE); Johan Vanhuyse, Vilvoorde (BE)

(72) Inventors: Mike Nicolai, Zonhoven (BE); Luca Salemio, Leuven (BE); Johan Vanhuyse, Vilvoorde (BE)

(73) Assignee: Siemens Industry Software NV, Leuven (BE)

( * ) Notice: Subject to any disclaimer, the term of this patent is extended or adjusted under 35 U.S.C. 154(b) by 430 days.

(21) Appl. No.: 15/143,866

(22) Filed: May 2, 2016

(65) Prior Publication Data

US 2017/0316126 A1    Nov. 2, 2017

(51) Int. Cl.
    *G06F 17/50*    (2006.01)

(52) U.S. Cl.
    CPC .................. *G06F 17/509* (2013.01)

(58) Field of Classification Search
    CPC ....................................... G06F 17/50
    USPC ............................................. 703/1
    See application file for complete search history.

(56) References Cited

U.S. PATENT DOCUMENTS

| | | | | |
|---|---|---|---|---|
| 7,543,266 B2* | 6/2009 | Brown, Jr. | ............ | G06F 8/3135 703/22 |
| 7,644,377 B1* | 1/2010 | Saxe | ............ | G06F 17/50 716/106 |
| 8,170,970 B2* | 5/2012 | Bagley | ............ | G06N 5/003 706/45 |
| 2014/0095118 A1 | 4/2014 | Broodney et al. | | |
| 2014/0244218 A1 | 8/2014 | Greenberg et al. | | |
| 2015/0248505 A1* | 9/2015 | Nieuwenhuis | ............ | G06F 17/11 703/1 |
| 2016/0034825 A1* | 2/2016 | Ezick | ............ | G06N 5/022 706/12 |
| 2017/0052712 A1* | 2/2017 | Sebbah | ............ | G06F 3/0611 |
| 2017/0220364 A1* | 8/2017 | Kadioglu | ............ | G06F 9/45508 |

* cited by examiner

*Primary Examiner* — Andy Ho
(74) *Attorney, Agent, or Firm* — Lempia Summerfield Katz LLC

(57) ABSTRACT

A system and method for using modeling language for efficient generation of design architectures in a design system are provided. A design space problem is received by the design system. The design space problem is transformed into a design space model. One or more ensembles are generated from the design space model. One or more design architectures are generated from the ensembles.

19 Claims, 14 Drawing Sheets

SPACE MODELING LANGUAGE FOR THE GENERATION OF ENGINEERING DESIGNS

TECHNICAL FIELD

The present embodiments relate to a multi-stage design modeling for developing engineering designs.

BACKGROUND

When designing a small system with few inputs and few variables, the design space is small. For example, a system with only three Boolean variables allows for only eight total combinations ($2^n$). For a design space that expands to ten Boolean variables, the total combinations expand to 1024 combinations. For a complex piece of machinery, such as a turbine, the total combinations may reach the millions or more. As the number of combinations increase, the ability to automatically generate architecture designs for each and every feasible combination becomes prohibitive.

One technique for modeling systems is to use computational design synthesis to generate solutions and architectures. Computational design synthesis uses logic and algorithms to quickly generate multiple design architectures. Two different computational approaches are used, grammar based and declarative. Grammar based methods capture a designer's knowledge (e.g., from design catalogues, textbooks, or standards) in engineering design grammar, so that the knowledge may be used to generate solutions. Declarative based methods use object-oriented declarative configuration languages, in which logical constraints of a system may be specified.

Depending on the problem, the approaches may both have issues. A generative approach using graph grammars may generate many solutions quickly, however the generated solutions may be of low quality as the majority of architectures are not useable. The ratio of useable versus not useable architectures drops quickly when considering realistic problems, making a generative approach inefficient. A declarative approach using first-order logic is more explicit about the constraints of the design under consideration. The drawback for a declarative approach is that the time to solution is extremely high when considering complex problems. Using the declarative approach on a design problem may take days if not longer to generate architectures. As designs grow, the time to solution rises exponentially, not linearly, further requiring additional processing time and resources.

To tackle the exponential growth problem with computational design, design space decisions are often made early in the process to eliminate swaths of combinations. At this point, the impact of eliminating the combinations and how the combinations are related to later design decisions is unclear. For example, when designing a hybrid-drive train, the decision of which storage technology is used has a tremendous impact of the overall performance. Unfortunately, the evaluation may only be made after all decisions are made and one design is fixed. To create feasible design spaces, best practices may be used. Best practices, or those decisions based on prior performance, may lead to common and known solutions that leads to design fixation and a lack of innovation.

BRIEF SUMMARY

Embodiments are provided for a multi-stage process for generating design architectures. In the first stage, a finite constraint problem is solved. In the second stage, the architectures are generated using a Boolean Satisfiability Problem (SAT) solver. The multi-stage solving of a design problem drastically decreases the time to generate designs.

In one aspect, a method for generation of architectures is provided using modeling languages. A design space problem is received by a design system. The design space problem is transformed into a design space model. One or more ensembles are generated from the design space model. One or more design architectures are generated from the one or more ensembles.

In another aspect, a method for generating design architectures using one or more processors is provided. A first design space model is received by a processor. A first plurality of ensembles is generated from the first design space model. A second design space model is received. A second plurality of ensembles is generated from the second design space model. A third plurality of ensembles is generated based on the first plurality of ensembles and the second plurality of ensembles. One or more architecture designs are generated from the third set of ensembles.

In another aspect, an apparatus for generating design architectures is provided. The apparatus comprises a memory and a processor. Computer program code is configured to cause the apparatus to identify a design space problem. The design space problem is transformed into a design space model. One or more ensembles are generated from the design space model. One or more design architectures are generated from the one or more ensembles.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

Embodiments describe an engineering design system that helps designers to handle the combinatorial explosion when automatically designing systems. A two phase or stage approach allows for efficient and quick generation of design architectures, cutting down on processing time while not limiting design options. A design space problem is identified. The design space problem is transformed using a block based method into a design space model that entails a mathematically constrained problem. The mathematically constrained problem is solved; the solution is a plurality of ensembles (unique families of components/devices). The ensembles are then solved. The solution is one or more design architectures. The design architectures may then be simulated and selected for use.

The use of an intermediary phase (e.g., design space model to ensemble generation to architecture generation) instead of a direct generation of architectures (e.g., design space model to architecture generation) cuts the problem intelligently into parts. The first phase (ensemble generation) is efficiently solvable and drastically limits the amount of processing involved in the second phase by limiting the total number of combinations. The second phase (ensemble solving) may be processed in parallel, drastically cutting down on processing time. Using a multi-stage approach may entail a thousand times speedup for time to solution. For example, instead of taking 30 minutes, a design may be generated in under a second. Instead of days, a design may be generated in minutes. In this way complex design problems may be efficiently solved. A computer implementing the design system may operate more quickly, making the computer design system more efficient. The two stage system provides more efficient functioning of the computer.

Figure 1:
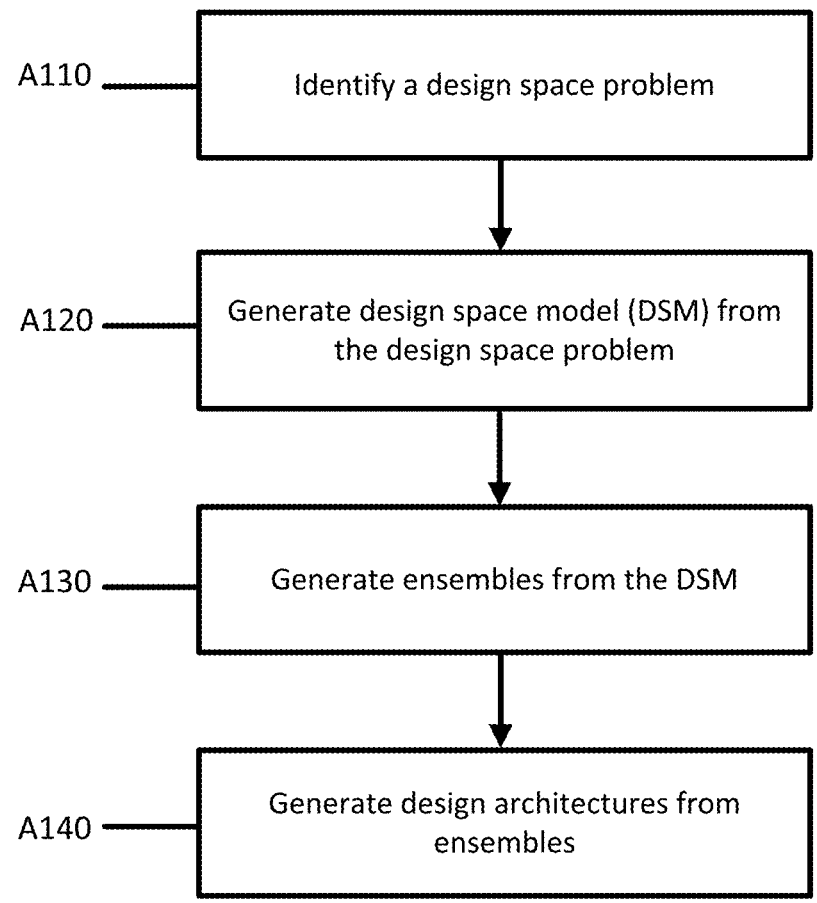
FIG. 1 depicts an example of a flowchart for a method of generating design architectures.

FIG. 1 illustrates an example flow chart for a multistage design problem solving process. The multistage process starts with a design space problem and generates one or more block-based architecture descriptions. Any of various devices and corresponding applications may implement all or portions of the method. For example, the act A110 may be implemented by an external computer device. Acts A120 through A140 may be implemented by one or more processors. Additional acts such as simulation and evaluation may be implemented by the server or by a client. The devices are configured by software or other programs to implement the acts. A communications network is used for any messaging or communications between the devices.

Additional, different, or fewer acts may be provided. For example, A140 may generate one or more architecture models that then may be simulated and evaluated in further acts. The acts may be repeated all together or in part. For example, only a piece of the problem identified at act A110 may be used in acts A120-A140. After model architectures for the piece have been generated, the workflow may repeat acts A120-A140 for the remainder of the problem or another piece. Act A110 may not be provided, such as the problem was previously identified.

At act A110, a design space problem is identified. The design space problem may refer to a design challenge. For example, "how can this drivetrain be designed?" The solution to the design space problem is a number of viable designs that may be simulated and evaluated. The design space problem is not field specific. Architectures for fields such as automotive, aerospace, computer, and others may be generated. Example systems that require complex architectures are hybrid drivetrain concepts, kinetic energy recovery systems (KERS), suspension systems, advanced driving assistant systems (ADAS), transmissions, electronic power systems, satellites, flight control systems, green taxiing systems, electric UAV design, high-lift devices, gear boxes, functional safety and failure injection, organic Rankine cycles, chemical plant design, marine and train hybrid systems, and others. The unifying factor for each of these systems is that the systems are embodied by the components, the relationships of the components to each other and to the environment, and basic engineering or scientific principles. Further, each of the systems may be decomposed into a series of components and rules. These factors allow a design space problem to be computationally modelled and solved.

Identifying the design space problem may include identifying the components and the component's relationships to one another. The design space problem may be described in natural language. For example, a design space problem for a vehicle may be described as having one or two batteries, one drivetrain, and a motor. There may be two to four different types of batteries and three different types of motors. The design space problem may further include how the battery, motor, and drivetrain interact. The motor is connected to the batteries and the drivetrain.

Identifying the problem may also include accessing an engineering library or database. In the example above, each motor may be a complex component that is governed by multiple rules. Identifying each rule may be prohibitive. A library that contains known components and principles may be used to supplement identifying the design space problem. A design space problem may be composed of multiple smaller problems. In the example given above for the drivetrain, each individual component such as the battery may include multiple components. The battery by itself may be a design space problem that was previously solved. Each component, once fully identified may then be used to identify the principal problem. For example, once the individual components and rules of a battery are identified, each of those individual components and rules may be added to the principal problem of how to design the vehicle.

At act A120, the design space problem is transformed into a design space model (DSM). The DSM may be stored in memory. The identified design space problem from act A110 (components/devices and rules) may be described in natural language. Such natural language may be interpreted and transformed automatically into a standard modeling language. In certain embodiments, the design space problem is transformed manually based on designer input (e.g. a designer may initially describe the design space problem in a standard modeling language). A designer may alter a DSM transformed previously by the system in order to customize or change the components and rules to suit the designers preferences. In other embodiments, the design space problem may be derived from an existing design space problem that has been transformed into a design space model. Additional libraries or databases may be used to transform the design space problem.

In order to allow for the multi-stage solving process, the design space model may be described using standardized language. Standard block based graphical languages may be used as the basis or foundation of the design space model. In certain embodiments, different domain specific modeling languages may be used to express information, knowledge or systems in the problem. For example, specific modeling language and rules for chemical designs or aerospace may be used. Modeling languages may include one or more components and a set of rules. The rules are used for interpretation of the meaning and interaction of components in the model. For example, a motor may be a component, and a rule may be how the motor interacts with another component, for example, the drivetrain. Existing modeling languages may be used for the foundation of the model. For example, the system may use Unified Modeling Language (UML), a standardized general-purpose modeling language.

Figure 2:
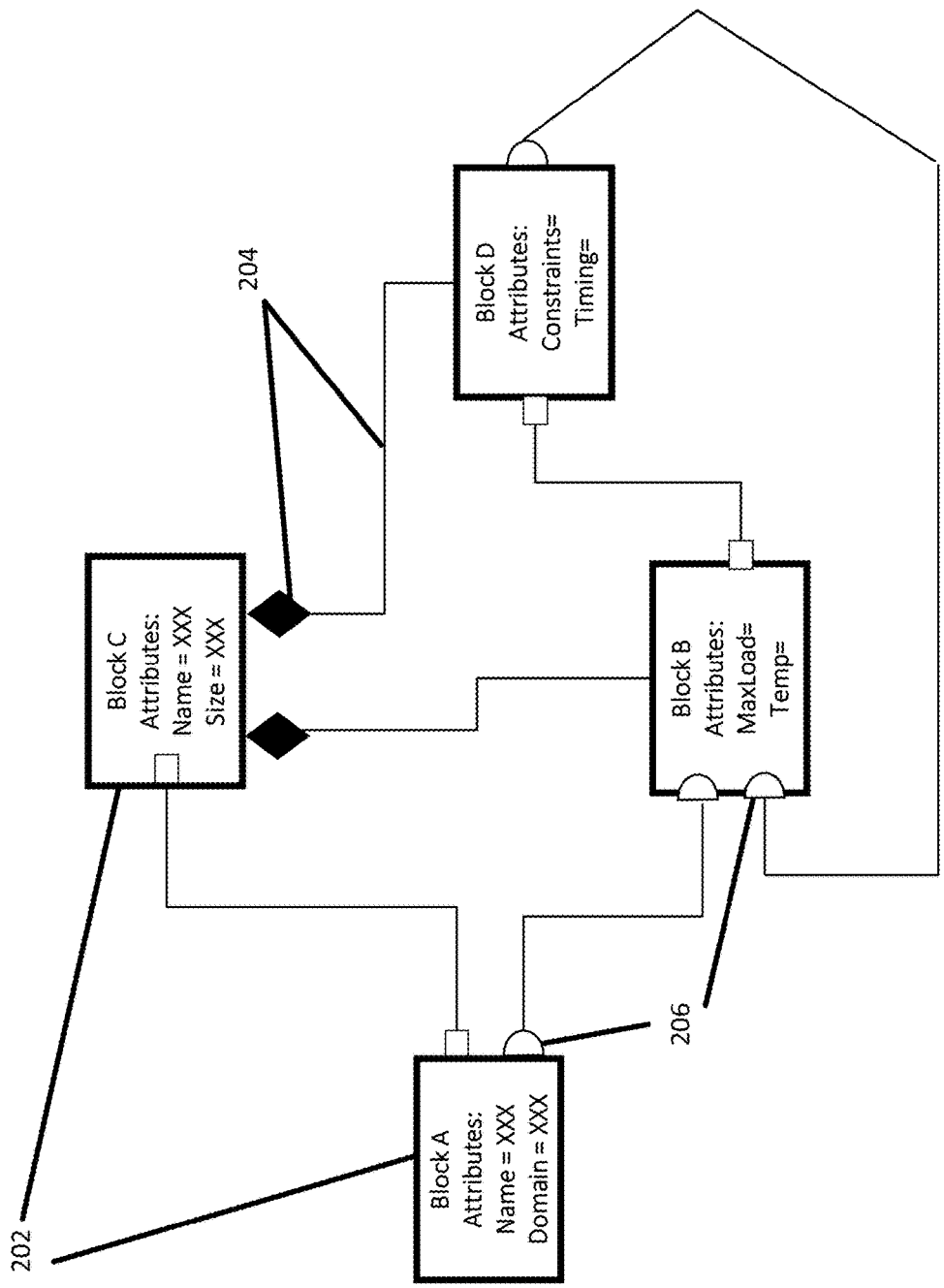
FIG. 2 depicts example elements of a block architecture.

Typical features may be incorporated from the UML or Systems Modeling Language (sysML) or other existing modeling languages. These general purpose languages include features and rules such as blocks as stereotypes, blocks having attributes, and blocks connected via ports. FIG. 2 depicts basic elements of a block architecture using blocks, ports, associations, connections, and block attributes. FIG. 2 depicts four blocks 202 (A, B, C, D), connections 206, and associations 204 between the blocks. The blocks 202 (A, B, C, D) may be referred to as components or devices and may represent objects in a design. For example, A may represent a battery, B a converter, C a motor, and D a control system. Each block 202 or component may further be governed by attributes such as rules or constraints that dictate how the components act. Inputs and output of each component may be represented by interfaces 206 (ports). As shown in FIG. 2, different interfaces may be used to designate different types of ports. For example, the square port may indicate one type of input/output, while the semi-circle indicates a different input/output. The associations 204 define how the blocks are associated to one another. The diamond shape may indicate that one component is part of another component (sub-component). For example, Block D is associated with Block C. Block D may be a sub-component or a type of Block C. Additional techniques outside of the standard modeling languages may be used to facilitate the two stage process.

Figure 3:
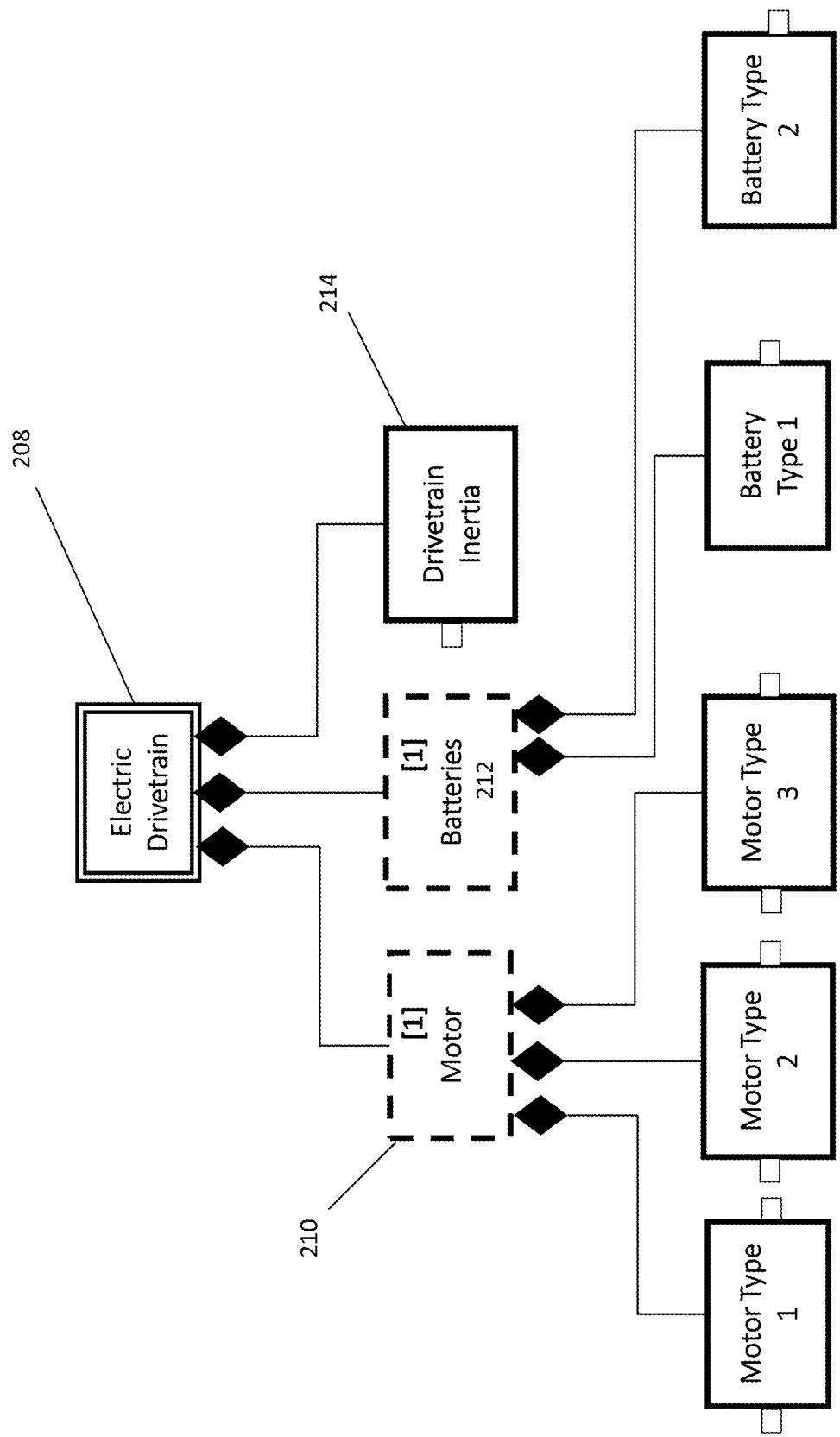
FIG. 3 depicts an example of a block based model.

FIG. 3 depicts an example block based model created as the DSM from the identified design space problem. In FIG. 3, an electric drivetrain is modeled. The electric drivetrain 208 is modeled using the batteries 212, a motor 210 and the drivetrain inertia 214. There may be multiple types of batteries and motors. Each of the battery and motor types has a connection to the drivetrain inertia. The connections are indicated by the ports from the drivetrain inertia to each of the batteries and one of the motor types. Each of the motor types also is connected to the battery types. In this example, the batteries and motor may also represent fully detailed models and may be self-contained models. FIG. 3 indicates that the electric drivetrain includes [1] battery and [1] motor. Certain examples may include one or components. For instance, in a similar example to FIG. 3, the model may have indicated that the number of batteries is anywhere from [1 . . . 5].

Each design component or item (relationship, multiplicity, etc.) may have a priority that allows for ordering of the generated architectures before the actual generation happens. In this way, a designer may select architectures to investigate first, without discarding others. For example, in FIG. 3, if a certain item, e.g. Motor type 2, is selected, all solutions with this item may be generated first. Solutions using Motor type 1 and/or other types are generated after the solutions for Motor type 2. Using priorities may allow a designer to focus in on a particular segment of the model.

Figure 4:
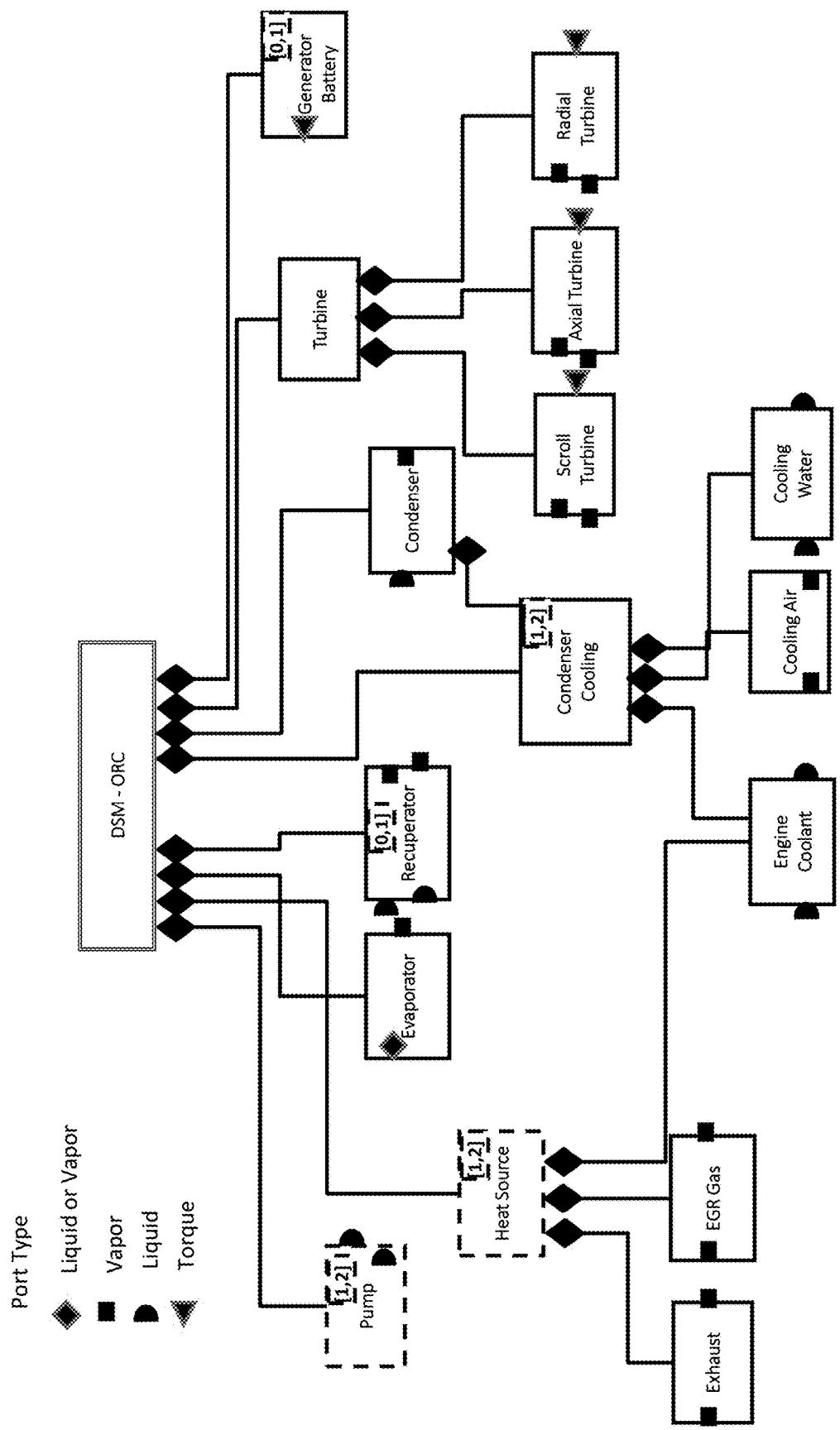
FIG. 4 depicts another example of a block based model.

FIG. 4 depicts another example block base model created as the DSM from the identified design space problem. In FIG. 4, an organic Rankine cycle (ORC) is modeled. FIG. 4 includes a pump, evaporator, recuperator, condenser, turbine, generator battery, heat source, condenser cooling and other components.

As in UML, connections between blocks are realized via connections of ports. For the DSM, potential connections may be defined via the scope and the type of ports. For example, in FIG. 4, there are four different port types: [liquid], [vapor], [torque], and [liquid or vapor]. The port types and other attributes of the components define how the organic Rankine cycle works. Ports may also have scope and limitations. For example, if a designer wanted to further limit the possible connections, the designer may use restricted connections and prescribed connections. Such connections may be between single ports, group of ports or all ports of a block and single ports, group of ports or all ports of another block. The indicated connection is either completely prohibited for restricted connections or limited to the indicated connection for prescribed connections. For example, in FIG. 4 if the designer identifies that the evaporator and the condenser blocks should not be connected, the designer may restrict the connection. Additionally, if the designer identifies that the turbine either has to be connected with the recuperator or the condenser, the designer may indicate both connections as prescribed. Other connection types may be used.

Figure 5:
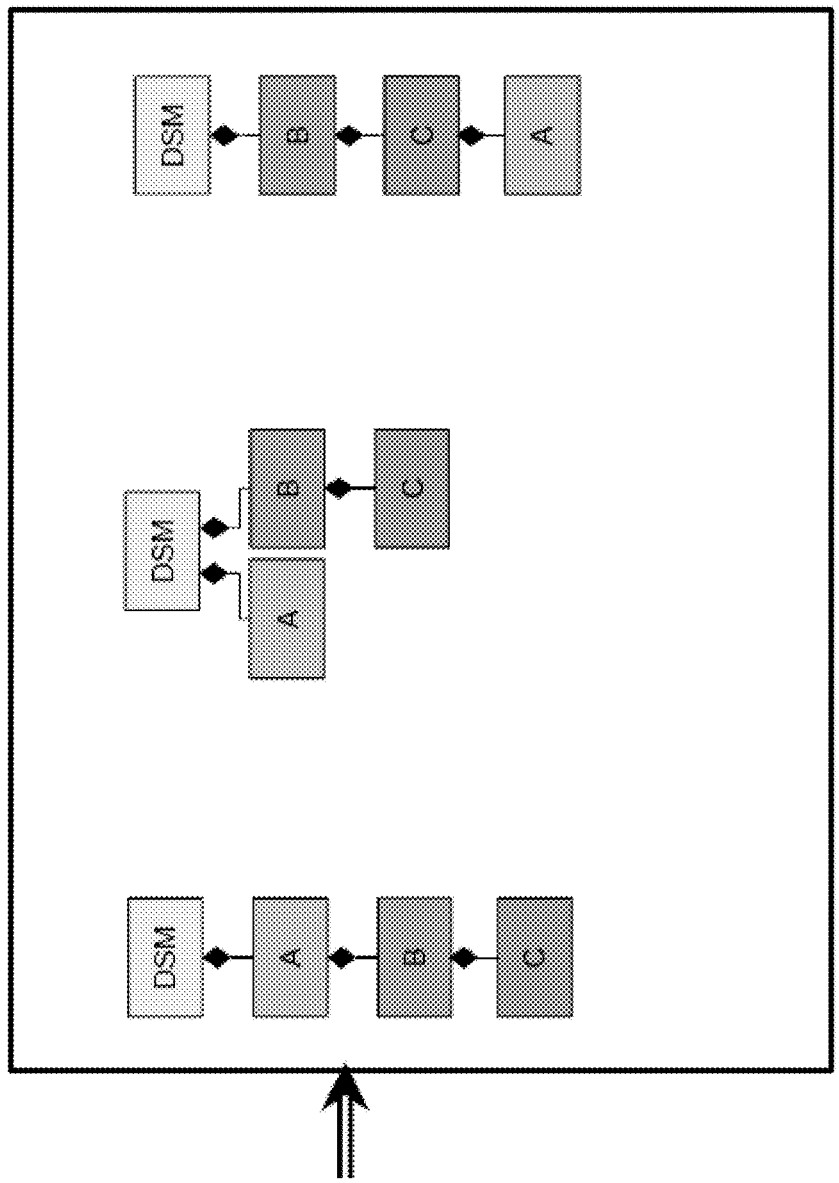
FIG. 5 depicts an example of a cyclical ownership loop and the related port consistent ensembles.
Figure 5:
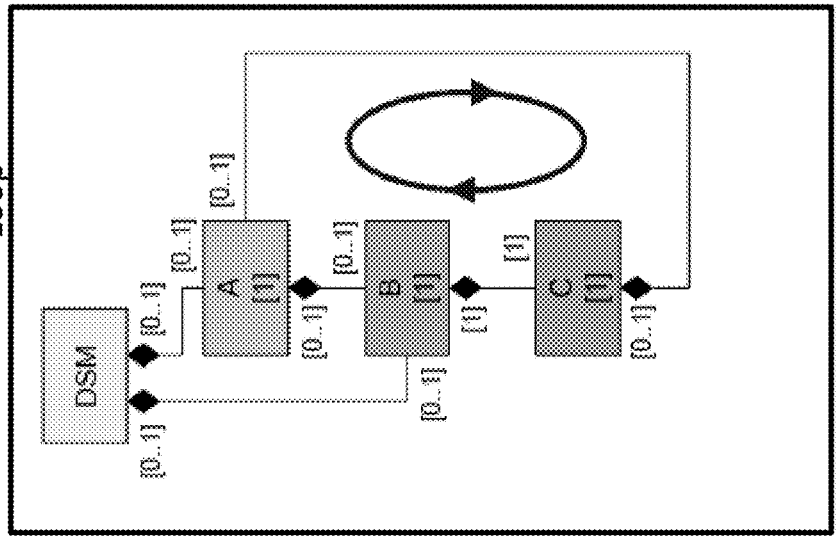

The DSM may also allow for multiparenting. Using multiparenting, an ambiguous ownership situation may be described in a block based model. When using multiparenting, certain problems arise such as the possibility to have a cyclical ownership. As such, cyclic ownership is not realizable in certain technical systems. For example, a subgroup of a subsystem cannot contain the subsystem itself. However, both multiparenting and cyclic ownership may be allowed by solving for potential solutions and adding back the new architectures into the design space model. In these instantiated architectures, the cyclic-ownership is resolved, and therefore disappears. For example, in FIG. 4 depending on which temperature the system is using, the block engine coolant may be used in either the heat source or the condenser cooling; the ownership of that block is therefore ambiguous. FIG. 5 depicts an additional example for a cyclic ownership loop, and the possible auto generated instances. FIG. 5 illustrates three blocks [A], [B] and [C] that are cyclic; [A] is part of [C] that is part of [B] that is part of [A]. The cyclic ownership may be overcome when solving for solutions by breaking the design space model into individual separate auto generated instances. Blocks [A], [B], and [C] may be modeled using one of the three port consistent ensembles shown on the right, either [C] is part of [B] that is part of [A]; [C] is part of [B]; or [A] is part of [C] that is part of B. Other port consistent arrangements may be used.

In the DSM, cardinality of component associations may be used for defining various realizations. In object-oriented modelling, some variability of the instances is described via the cardinality of object associations. In addition, a block multiplicity may be used to explicitly give the possibility to indicate how many instances of the block may be generated.

Figure 6:
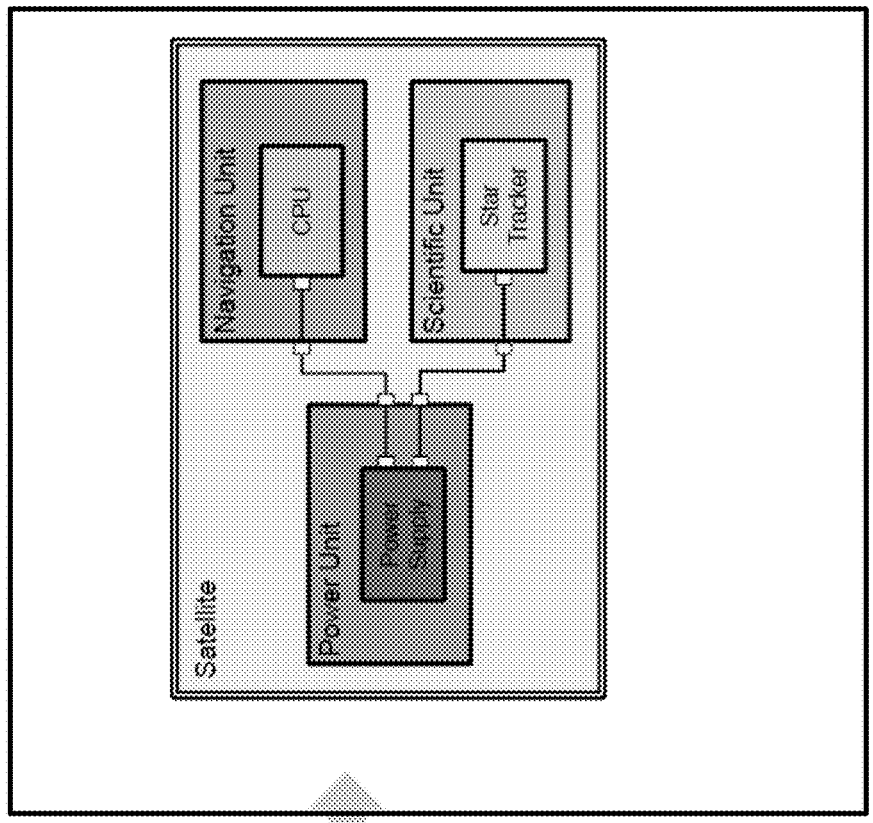
FIG. 6 depicts an example of aggregated components and connection consistent architecture.
Figure 6:
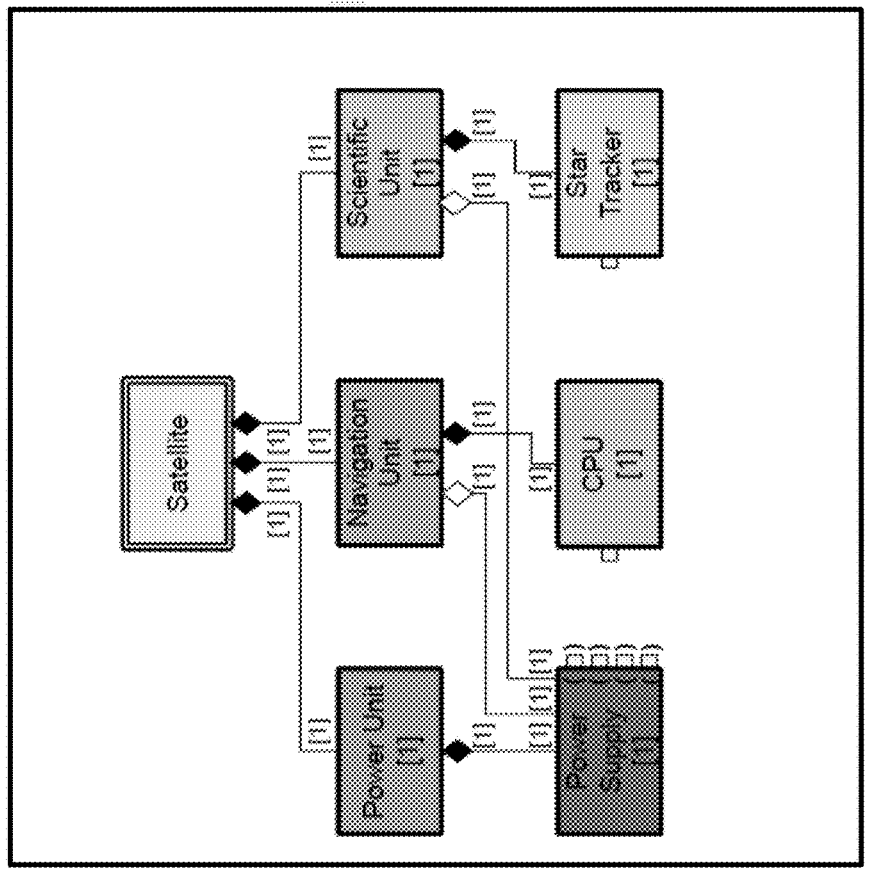

The DSM also allows the designer to group (aggregate) certain blocks (components and assets) to create a logical decomposition. By specifying a collection, the designer may define how many contained blocks may be used in one of the realized architectures. In this way, the solving process selects from the collection a number of components. The interface may mutate depending on the used block. The mutation is a way of expressing polymorphism. For example, in FIG. 4 both the heat source and the condenser cooler blocks are collections. Another way of realizing polymorphism is through optional ports. In contrast to a typical port, optional ports do not necessarily have to be connected. Therefore, optional ports are a way to realize polymorphism. FIG. 6 illustrates another example of blocks using aggregation. FIG. 6 depicts how the power supply block is used in different blocks using aggregation. Since it might not been clear how many ports are needed from the power supply, the designer may select to use optional ports to circumvent this situation. In the connection consistent architecture realization of the satellite, the power supply block is only using the needed amount of ports.

The DSM further uses realizable architectures. Realizable architectures assist in evaluation using simulation tools. Evaluation may include populating the simulation models with the resulting architectures. The population depends on the context of the created architecture. Depending on the used tool, different simulation models have to be used and therefore are linked to certain blocks in the DSM. In this way, the DSM is able to connect logical architectures with physical simulations. This feature may also give indications of which simulation models are missing to create a realizable architecture.

Returning to FIG. 1, at act A130, ensembles (or unique families of blocks) are generated from the DSM. The DSM may include a number of variables and constraints. The variables and constraints may constitute a mathematical problem. The mathematical problem may be solved using a constraint satisfaction problem (CSP) solver to select the number of blocks in a possible solution. The solving of the DSM to generate ensembles is the first stage of the two stage solving process.

Figure 7:
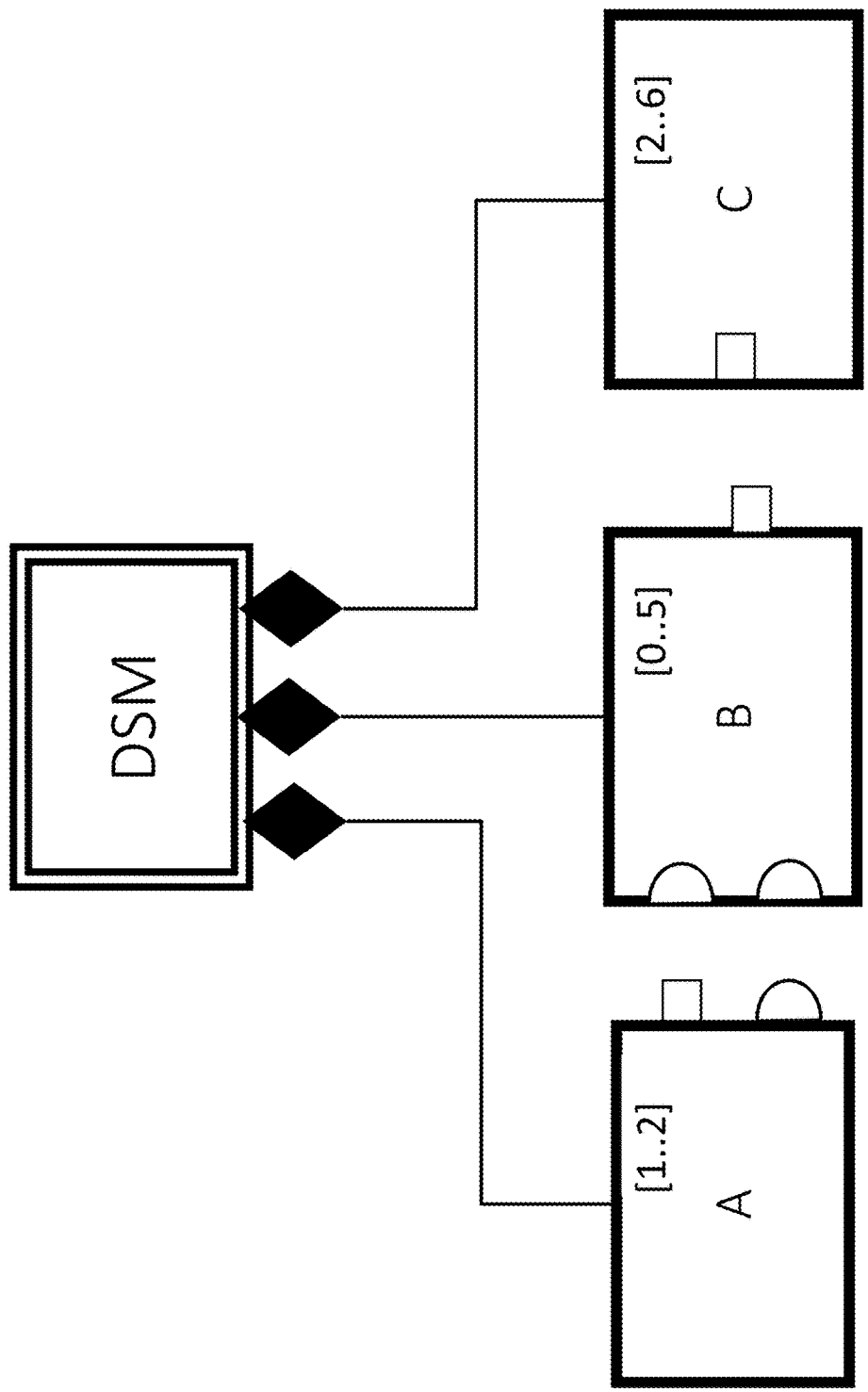
FIG. 7 depicts an example design space model (DSM).
Figure 8:
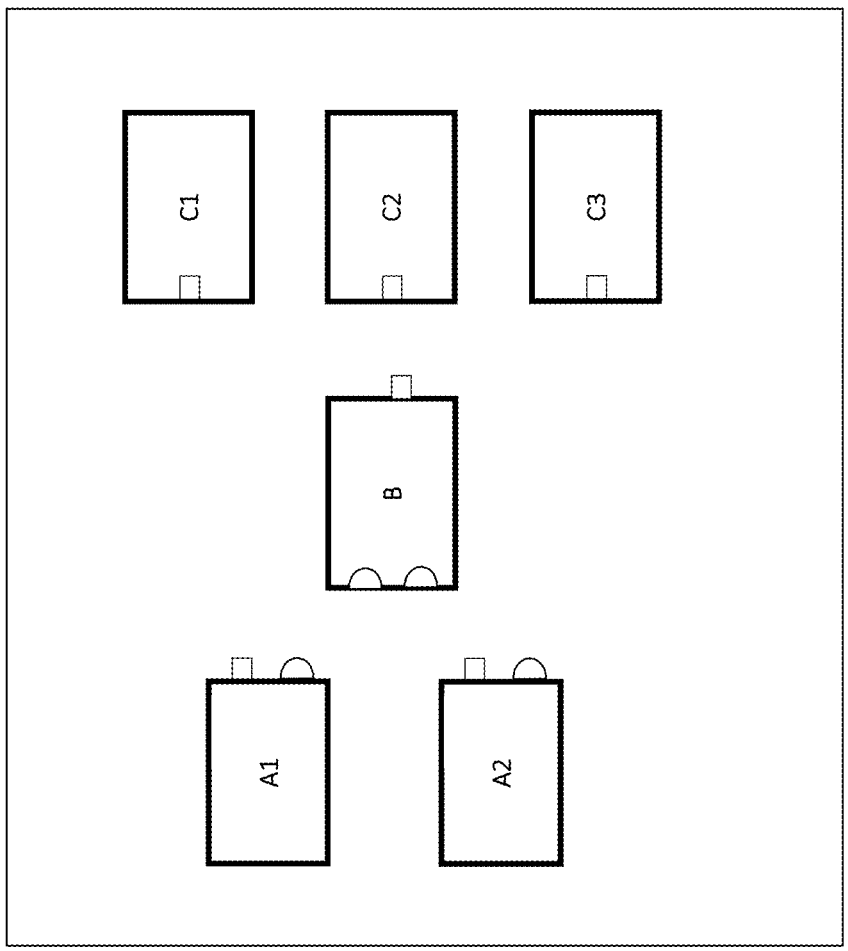
FIG. 8 depicts an example finite constraint satisfaction problem and solution.
Figure 8:
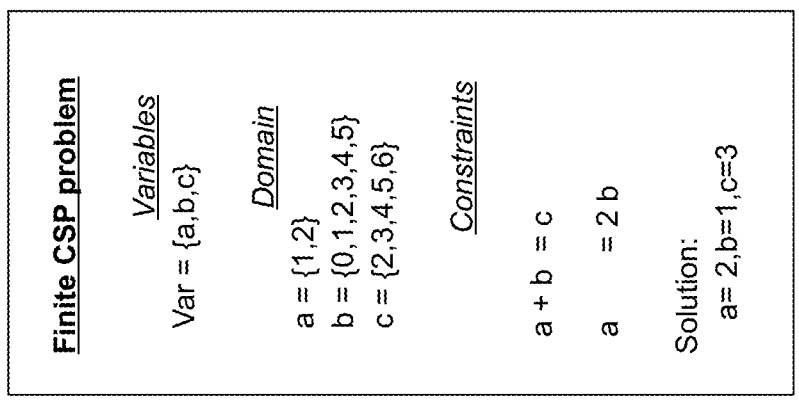

A simple design space model to ensembles process is shown in FIGS. 7-9. FIG. 7 illustrates a DSM as generated in act A120. In this example, there are three blocks representing three variables (A, B, C). The domains (possible instances) of each variable are as follows A={1,2}, B={0, 1,2,3,4,5}, C={2,3,4,5,6}. The DSM may contain either one or two [A] blocks, from zero to five [B] block, and from two to six [C] blocks. Using a real world example for an electric vehicle, there may be one or two drivetrain types, from zero to five batteries, and between two and six different motors. There are two constraints that may be derived from the ports on each component. For each [A] and each [B], there is one [C]. This is described by the square ports; one output each on [A] and [B] and one input on [C]. There are twice as many [A]'s as there are [B]'s. This is described by the ports on [A] and [B]—one output on [A] and two inputs on [B] (for each [B] block, there needs to be two [A] blocks to provide the inputs). The constraints make up the equations: A+B=C and A=2B. Given these variables and constraints, the problem becomes how many of each [A], [B], and [C] may be used to generate a feasible solution. This is a finite constraint satisfiability problem (CSP) problem that may be solved by a CSP solver. The constraints, domain, and variables are shown in FIG. 8 along with the solution to the finite CSP problem.

A CSP is a problem where relations between variables may be stated in the form of constraints. Constraints do not specify a step or sequence of steps to execute but rather the properties of a solution to be found. As such, CSPs are solved through search. Searching a CSP involves first choosing a variable, and then assigning a value to the variable. The search may be repeated until every possible solution is identified. A solution to a CSP is an assignment to every variable of some value in its domain such that every constraint is satisfied. Different CSP solvers may use different algorithms or search strategies to cut down on the processing power and speed required. An off the shelf CSP solver may be used to solve the problem in act A130. In certain embodiments, a custom CSP solver may be used to solve specific problems. For example, a solver for a satisfiability modulo theories (SMT) problem may be used.

The solution for the example in FIG. 8 is A=2, B=1, and C=3 (2+1=3; 2=2×1). The solution represents a single ensemble (or unique family of blocks). In this example, there is one ensemble that has two [A] blocks, one [B] block, and three [C] blocks. In certain embodiments, there may be multiple solutions (multiple ensembles). Each ensemble includes a unique set of components. For example, if the domain for [A] was expanded to include [4], an alternative set of blocks (and alternative solution) for FIG. 8 is A=4, B=2, C=6. The alternative set of blocks is considered a separate ensemble as the set of blocks is unique (contains a different combination) from the ensemble A=2, B=1, and C=3, which remains a solution where the domain for [A] is 1-4.

In certain embodiments, the CSP solver may search for and find every solution to the DSM. In other embodiments, the CSP solver may be stopped at a certain point due to time constraints or designer input. For example, a designer may only request a certain number of ensemble solutions. A designer may specify one or two components that are required in the solution. Such an embodiment may allow a designer to work through specific subsets of a model before attempting to evaluate the entire system.

In certain embodiments, other algorithms may be used to solve for ensembles. For example, a simplex algorithm may be used. A mixed-integer solver may be used. Integral linear programs may be used. A solver for a discrete or continuous equation system may be used. Other algorithms, such as a general-purpose constraint integer programming solver or another optimization solver may be used for this act and /or act A140.

Ensembles are provided for the overall DSM. The DSM may be made up smaller models that together form a larger model. For example, a design space model for a motor may include multiple smaller design space models (e.g. for each component). Each individual DSM may be solved for the ensemble solutions that solve the constraints and variable for the smaller design space model. The ensembles from different DSMs may be also combined or excluded to generate the one or more design architectures. In certain embodiments, a designer may prioritize the solving so that ensembles with a selecting component or block may be identified first. The set of ensembles for the DSM may include different variations due to ensemble options of the smaller DSMs or each DSM is handled separately.

At act A140 of FIG. 1, design architectures are generated from the ensembles. After act A130, the blocks in the generated ensembles lack connections. Design architectures are generated by creating connections between the blocks for each ensemble. FIG. 9A illustrates all the possible connections generated for the two [A] blocks, one [B] block, and three [C] blocks that were generated in act A130 in the example of FIGS. 7 and 8. Each port is connected to related ports. For example, the square outputs from A1 are connected to each of the square inputs for the [C] blocks. These connections represent possible combinations. Taken together, these connections create a first-order logic problem illustrated by FIG. 9B. The first-order logic problem depicts each possible arraignment for each block. For example, the first equation: one-hot (A1.1↔C1.1, A1.1↔C2.1, A1.1↔C3.1) indicates that only one these connections are possible, e.g. All may be connected to one of C1.1, C2.1, or C3.1. Likewise for the second equations: one-hot (A1.2 ↔ B1.1, A1.2 ↔ B1.2). These two equations describe the possible connections from block A1. There are six possible connection combinations from Block [A]. The equations below this first equations describe the possible connections between other blocks. The six equations represent a first-order logic problem that may be solved using a Boolean satisfiability problem (SAT) solver.

A SAT problem is a Boolean satisfiability problem where the solution to a particular instance of the problem is either "yes" or "no". For the problem shown in FIG. 9B, the solution to the SAT problem is when each equation is satisfied. For example, a solution for the problem in 9B may be found from connections that satisfy everyone of the following one-hot equations:

$$\text{one-hot}(A1.1 \leftrightarrow C1.1, A1.1 \leftrightarrow C2.1, A1.1 \leftrightarrow C3.1)$$

$$\text{one-hot}(A1.2 \leftrightarrow B1.1, A1.2 \leftrightarrow B1.2)$$

$$\text{one-hot}(A2.1 \leftrightarrow C1.1, A2.1 \leftrightarrow C2.1, A2.1 \leftrightarrow C3.1)$$

$$\text{one-hot}(A2.2 \leftrightarrow B1.1, A2.2 \leftrightarrow B1.2)$$

$$\text{one-hot}(A1.2 \leftrightarrow B1.1, A2.2 \leftrightarrow B1.1)$$

$$\text{one-hot}(A1.2 \leftrightarrow B1.2, A2.2 \leftrightarrow B1.2)$$

$$\text{one-hot}(B1.3 \leftrightarrow C1.1, B1.3 \leftrightarrow C2.1, B1.3 \leftrightarrow C3.1)$$

$$\text{one-hot}(A1.1 \leftrightarrow C1.1, A2.1 \leftrightarrow C1.1, B1.3 \leftrightarrow C1.1)$$

$$\text{one-hot}(A1.1 \leftrightarrow C3.1, A2.1 \leftrightarrow C2.1, B1.3 \leftrightarrow C2.1)$$

$$\text{one-hot}(A1.1 \leftrightarrow C3.1, A2.1 \leftrightarrow C3.1, B1.3 \leftrightarrow C3.1)$$

The term one-hot refers to a group of bits among which the legal (true) combinations of values are only those with a single high (1) bit and all the others low (0). For example, one-hot(1,0,0,0,1,0,0,0) returns false as two of the bits are high (hot). One-hot (0,1,0,0,0,0,0) returns true as only one of the bits is high (hot). Other combination tests may be used.

Figure 9B:
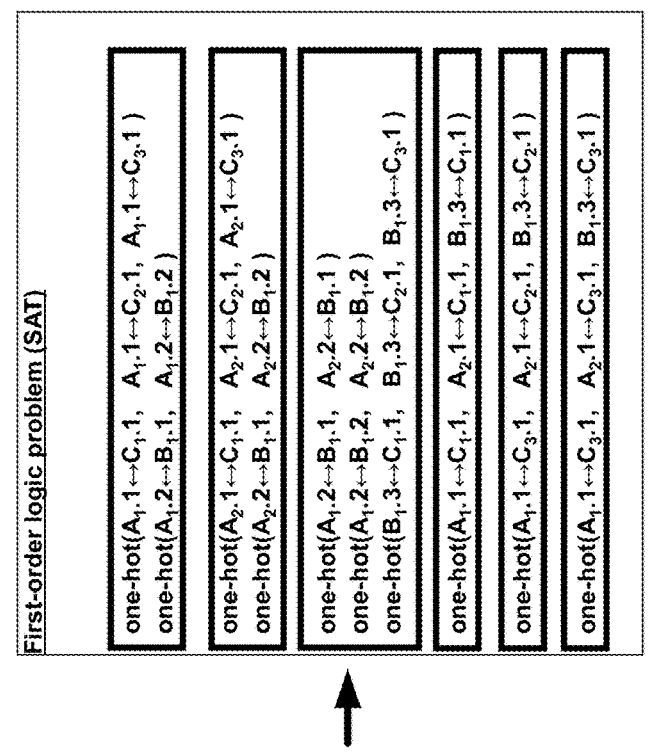
FIG. 9B depicts a first order logic problem derived from FIG. 9A.
Figure 9A:
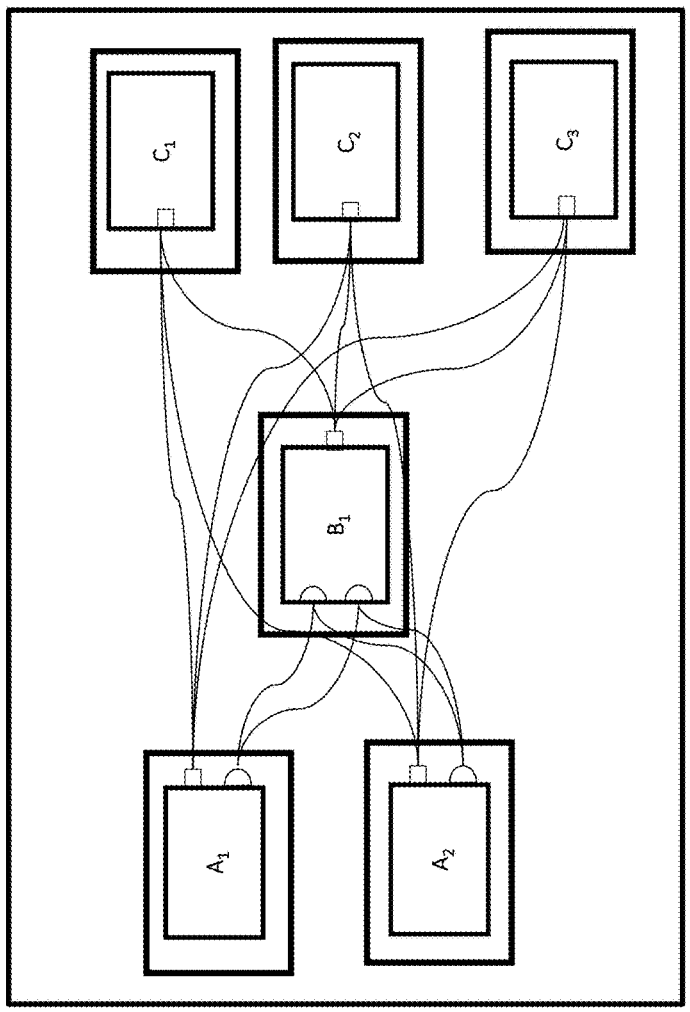
FIG. 9A depicts an example of connection generation for the solution of FIG. 8.
Figure 10:
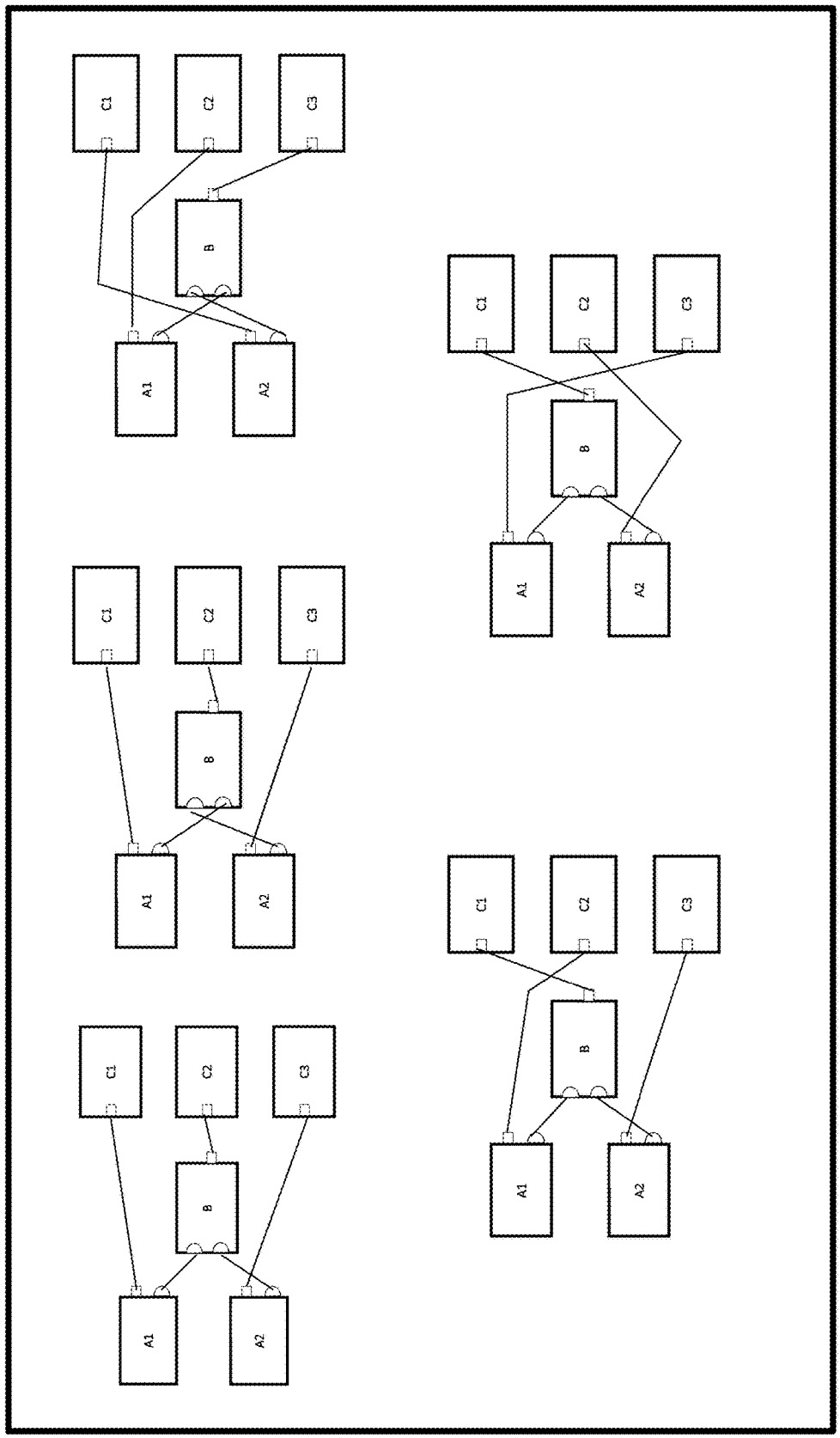
FIG. 10 depicts example architectures to the first-order logic problem of FIG. 9.

For example in FIG. 9B, one-hot(A1.1 ↔ C1.1, A1.1 ↔ C2.1, A1.1 ↔ C3.1) indicates that only one of the three connections is possible. In order for the set of equations to be true, each line must be true. One set of connections [A1.1 ↔ C1.1, A1.2 ↔ B1.1, A2.1 ↔ C2.1, A2.2 ↔ B1.2, B1.3 ↔ C3.1], returns each and every one-hot equation as true and as such is one possible solution for the SAT problem. FIG. 10 illustrates five possible solutions to the model from FIG. 7. There are additional solutions to the SAT problem not shown. These solutions are design architectures that satisfy the design space problem identified in A110.

For the design space example in FIG. 7, there is only one ensemble generated in the first stage. In certain embodiments, a plurality of ensembles are generated that are solved using a SAT solver. Each ensemble may be solved separately in parallel. For example, instead of a single processor or machine solving each ensemble in series (one after another), multiple processors may be used to drastically cut down on the time for a solution to be generated. For a design space model with ten ensembles, by processing the ensembles in parallel, the solution may be generated in as little as 10% of the time finding the solution if computed in series. Parallel processing of the ensembles is possible as each ensemble is not dependent on the other ensembles. A network of computers and/or multiple processing cores may be used for parallel solving. Because the ensembles include unique combinations of blocks, the solutions may be different for different ensembles.

The output of act A140 is one or more potential design architectures that solve the design space problem identified in act A110. Additional acts may be undertaken after the design architectures are generated. For example, once the architectures have been generated, the architecture (or individual models) may be populated and then simulated. The simulations may assist in determining an optimal design or number of designs for implementation. The architectures may be output on a display to a designer for review, selection, and/or alteration.

Figure 11:
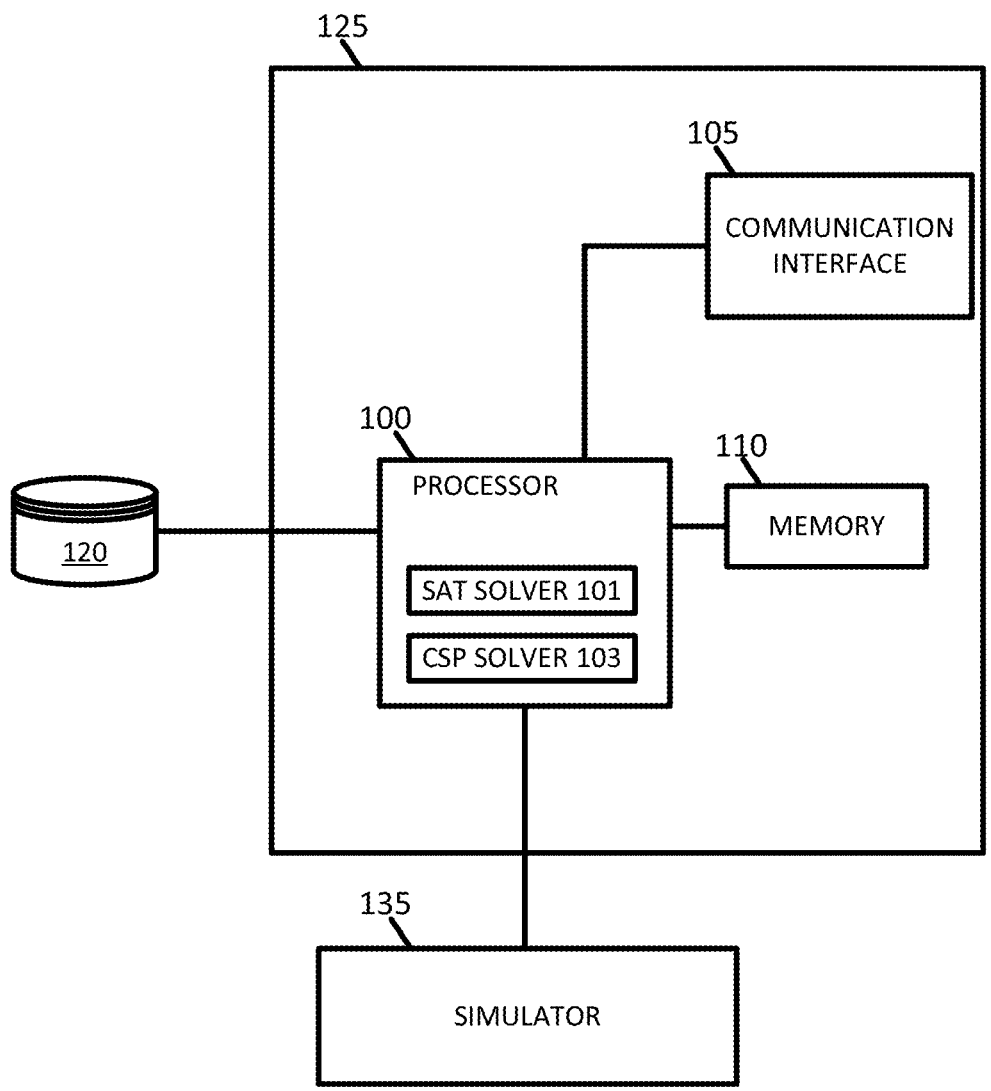
FIG. 11 depicts an example system for generating design architectures.

FIG. 11 illustrates an example system configured to solve a design problem with a multistage process. The system is a generalized example. Additional, different, or fewer components may be provided. The system is configured to identify a problem and output possible solutions. The system includes one or more processors 100 attached to a memory 110.

The one or more processors 100 may be configured to operate in parallel or in series, such as multiple processors in a same workstation or networked computers and/or servers. The one or more processors 100 may include a SAT solver 101 and a CSP solver 103. The one or more processors 100 may be hardware specialized processors such as graphics processing units (GPU). The one or more processors 100 may be configured to provide custom data path and control for specific algorithms and applications. The one or more processors 100 may be hardware configured to enable rapid design space modeling including solving SAT and CSP problems. The one or more processors 100 may include circuits configured to solve SAT or CSP problems. The one or more processors 100 may include a plurality of compilers configured to operate in parallel. The one or more processors 100 are connected to the communications interface 105, such as a user interface or input and display and/or a network interface card. The one or more processor 100 may be connected to a database 120, such as for storing templates, blocks, constrained, prescriptions, and/or other design information. The one or more processors 100 may be connected to a simulator 135, such as for simulating results from automated design. The system 125 may operate as a service. The communications interface 105 may be configured to transmit and receive data through a network to workstations or other computing devices.

Figure 12:
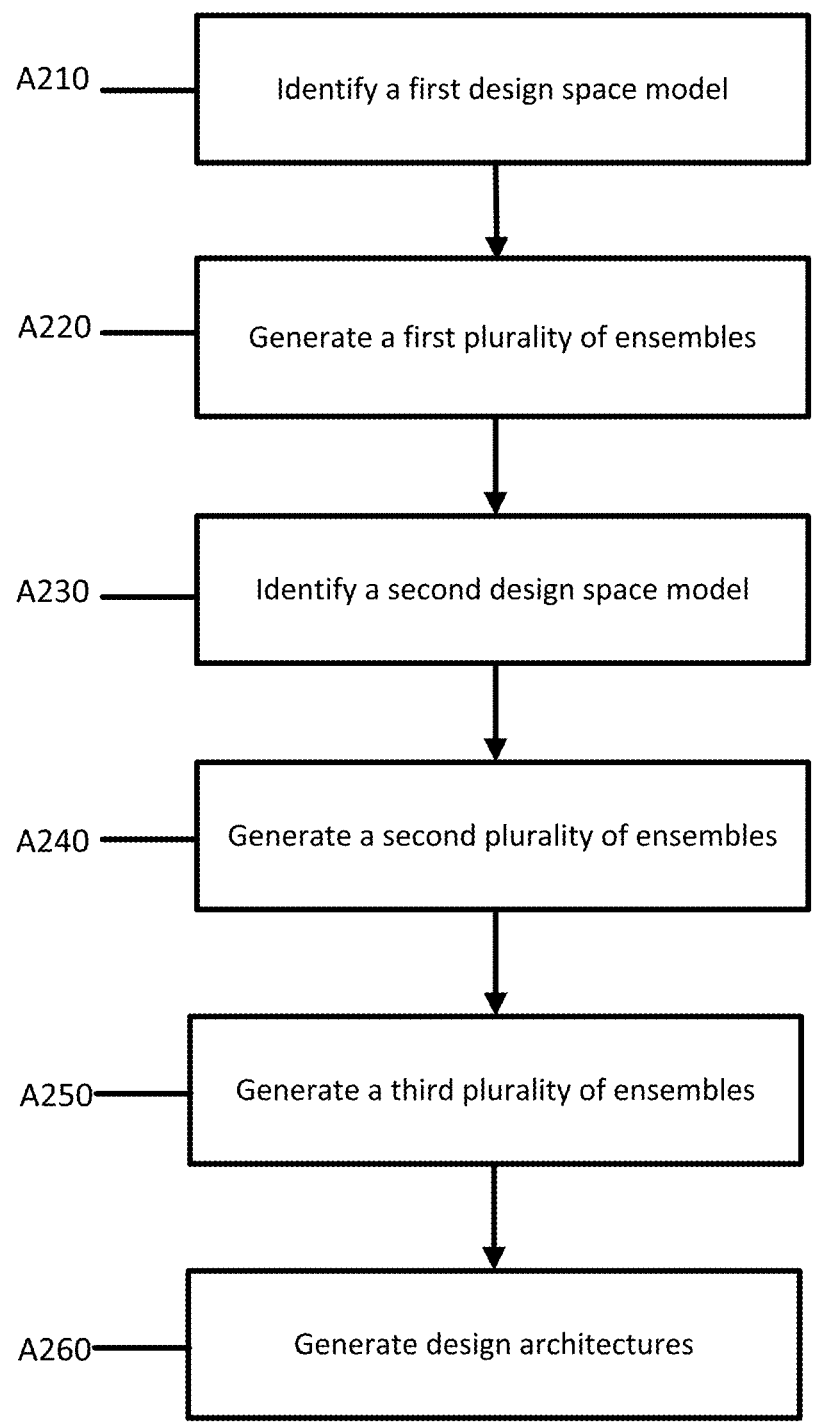
FIG. 12 depicts an example of a flowchart a method of generating design architectures using the system of FIG. 11.

FIG. 12 illustrates an example workflow for a multistage problem solving process using the system of FIG. 11. Additional, different, or fewer acts may be provided. For example, A260 may generate one or more architecture models that then may be simulated and evaluated by the simulator 135. The acts may be repeated all together or in part. The acts include two design space models. In certain embodiments, the acts may be performed using two, three or more design space models.

At act A210, the processor 100 identifies a first design space model. The first design space model may be stored in memory 110 or in the database 120. The first design space model may be generated by a designer or received from the communications interface 105. The database 120 may maintain a library of design space models that have been previously identified or generated. The first design space model may include one or more components and one or more rules. The memory 110 or database 120 may include data related to the one or more components and/or one or more rules. For example, one of the components may be a motor. The database 120 may maintain a library of known motor types. The library may include design models for each motor type including sub-components and a set of rules that govern each motor type. The first design space model may be described in a modeling language, such as a block based modeling language. The first design space model may include one or more constraints and one or more variables.

At act A220, the processor 100 generates a first plurality of ensembles from the first design space model. The constraints and variables for the first design space model may make up a constraint satisfiability problem (CSP). The CSP is a problem where relations between variables may be stated in the form of constraints. A constraint satisfiability problem may be solved by a CSP solver 103. The processor 100 may include one or more CSP solvers 103. A CSP solver 103 is the processor 100 configured by a CSP software or firmware, but may be a field programmable gate array or application specific integrated circuit. The CSP solver 103 may identify all possible solutions of variables that satisfy the constraints. The solutions (referred to as ensembles) may be the number of components that satisfy the constraints of the DSM. The ensembles may be unique sets of components (blocks). The generated first plurality of ensembles may be stored in memory 110 or the database 120.

At act A230, the processor 100 identifies a second design space model. The second design space model may be stored in memory 110 or in the database 120. The second design space model may be described in a modeling language such as a block based modeling language. The second design space model may include one or more constraints and one or more variables. The second design space model may be a component or sub-component of the first design space model. The second design space model may include one or more components from the first design space model. For example, the first design space model may be for a vehicle including one or more batteries, one or more motors, and one or more control systems. In this example, the second design space may include the one or more batteries and the control system. The second design space may include one more constraints and one or more variables.

At act A240, the processor 100 generates a second plurality of ensembles from the second design space model. The constraints and variables for the second design space model may make up a constraint satisfiability problem. The CSP may be solved by the CSP solver 103. The CSP solver 103 may identify all possible solutions of variables that satisfy the constraints of the second design space problem. The solutions (referred to as ensembles) may be the number of components that satisfy the constraints of the DSM. The ensembles may be unique sets of components (blocks). The generated second plurality of ensembles may be stored in memory 110 or the database 120.

At act A250, the processor 100 generates a third plurality of ensembles based on the first and second plurality of ensembles. The first plurality of ensembles may represent one or more families of components that satisfy the first design space problem. The second plurality of ensembles may represent one or more families of components that satisfy the second design space problem. There may be overlap between the first plurality of ensembles and second plurality of ensembles. The first design space problem and the second design space problem may share components. In certain embodiments, the components in the second design space problem are a subset of the components of the first design space. For example, the first design space includes components A, B, C, D, and E. The second design space may include components C1, C2, E1, E2, and E3 for components C and E. The second design space may further include the same rules as the first design space.

In certain embodiments, the third plurality of ensemble may only include the overlap of the first plurality of ensembles and the second plurality of ensembles. In certain embodiments, the third plurality of ensembles may include the first plurality of ensembles with any members of the second set excluded. The third plurality of ensembles may include members of the first plurality of ensembles that include any combinations from the second plurality of ensembles. For example, the first set may include an ensemble (3A, 2B, 4C). If the second plurality of ensembles included an ensemble (3A, 2B), then the third set may exclude the ensemble (3A,2B,4C) as ensemble includes the combination of an ensemble from the second set. In another example, all possible ensembles creatable from the combinations of the pluralities of ensembles are identified and used as ensembles for the DSM.

Figure 13:
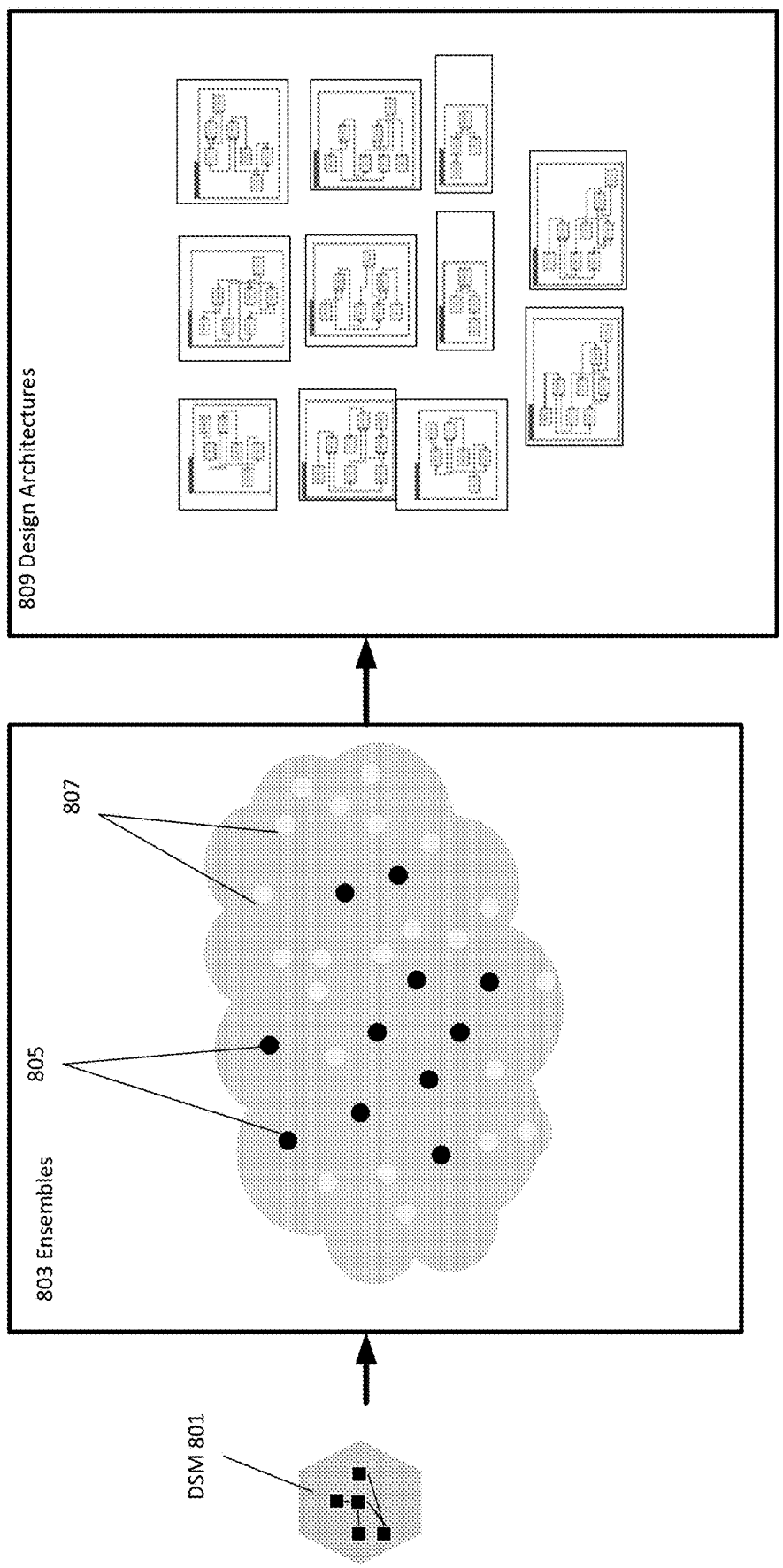
FIG. 13 depicts an example workflow for generating design architectures.
Figure 14:
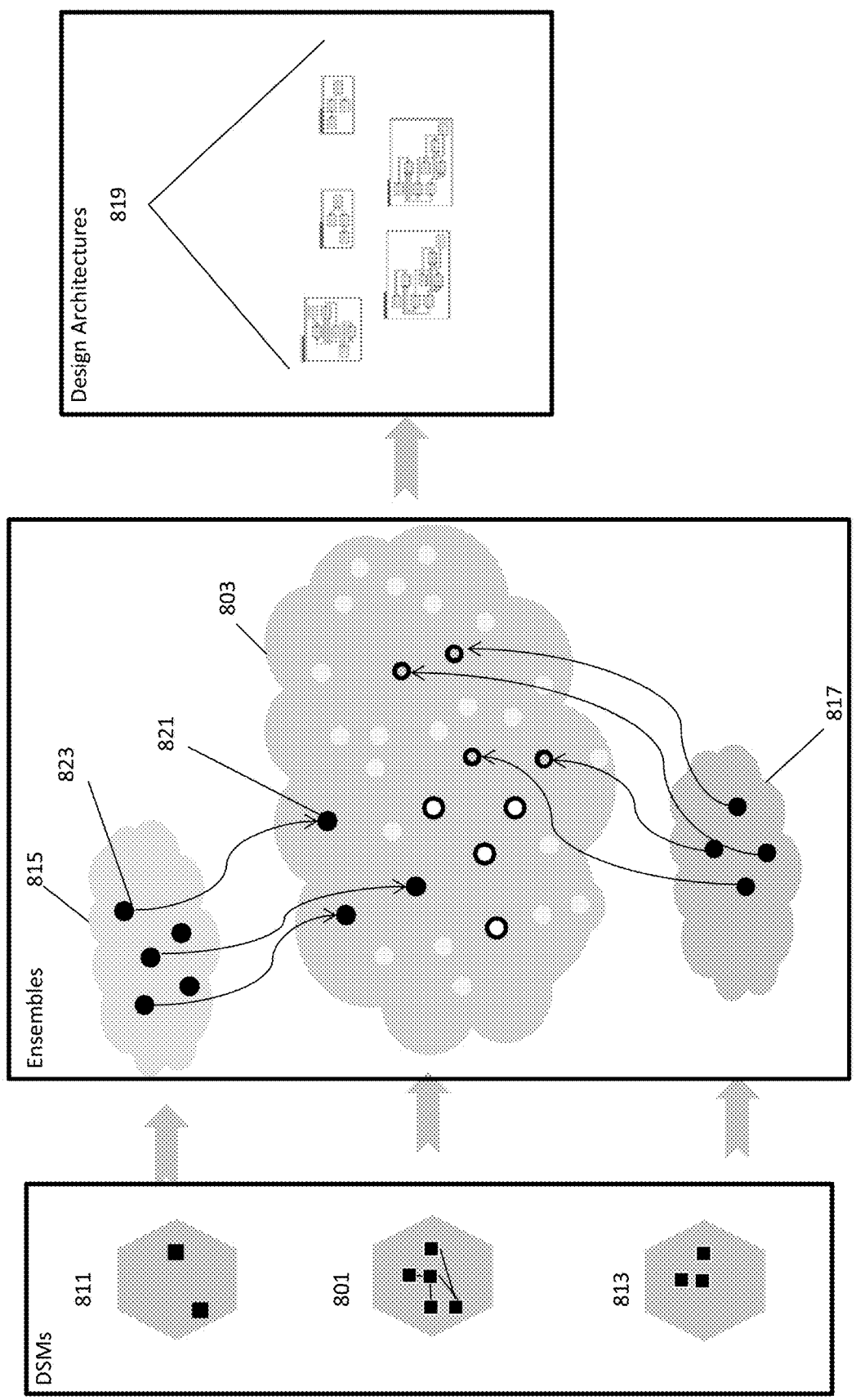
FIG. 14 depicts another example workflow for generating design architectures.

FIGS. 13 and 14 illustrate an example of selecting ensembles. FIG. 13 illustrates an example for a single design space. The DSM 801 includes components and rules. The cloud 803 includes every possible combination from the components in the DSM 801. Ensembles 805 are generated from the DSM 801. Alternative groupings of blocks that are not in the solution to the DSM are shown as groupings 807. The design architectures 809 are generated from the ensembles 805.

FIG. 14 illustrates an example with multiple DSMs 801, 811, 813. The clouds 815 and 817 relate to the ensembles generated by the respective DSMs 811 and 817. In this example, both DSMs 811 and 813 include a subset of components from DSM 801. The ensembles are generated for each DSM. Once the ensembles are generated, each plurality of ensembles may be compared to one another. Overlap is shown in FIG. 14 by the lines between ensembles. For example, some architectures from ensemble 823 relates to some architectures inside 821. A designer may select groups of ensembles with which to continue the process. For example, a designer may proceed only with the architectures that overlap between DSMs 811 and 801. In the alternative, the designer may select to proceed with architectures from DSM 801 excluding any from DSM 813. Any selection criteria may be used.

At act A260 of FIG. 12, the processor 100 generates one or more design architectures from the third plurality of ensembles. The one or more design architectures may be generated using the SAT solver 101. The SAT solver 101 is the processor 100 configured by a SAT software or firmware, but may be a field programmable gate array or application specific integrated circuit. The SAT solver 101 may solve for connections between blocks in the third plurality of ensembles. Each of the plurality of ensembles may be solved by the SAT solver 101 in parallel. As shown in FIGS. 13 and 14, by excluding certain system patterns described in a DSM 811, a designer may efficiently cut down on the time the processor 100 takes to generate the design architectures 819 without having to solve for each ensemble from DSM 801 and subsequently excluding out design architectures. By including only certain ensembles from a sub-component, for example a battery, a designer may be able to focus in on certain design choices while cutting the time to generate each and every solution of a parent DSM. The one or more design architectures may be transmitted to the Simulator 135 for evaluation.

The Simulator 135 may be a standalone computing device or part of or implemented by the system 125 or the processor 100. The Simulator 135 may receive as inputs one or more design architectures. The Simulator 125 may simulate and evaluate one or more of the design architectures. The operation is simulated and outputs of operational parameters are provided for analysis.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking may be advantageous. Moreover, the separation of various system components in the embodiments described above should not be understood as requiring such separation in all embodiments One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing detailed description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the detailed description provided herein, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A method using modeling language for efficient generation of design architectures in a design system, the method comprising:
    receiving, by the design system, a design space problem for a combination of devices;
    transforming the design space problem into a design space model of the design system, the design space model representing the combination of devices;
    generating one or more ensembles of components in a memory from the design space model; and
    generating, by the design system, a plurality of design architectures of the combination of the devices from the one or more ensembles,
    wherein the plurality of design architectures are generated simultaneously by a plurality of processors operating in parallel, and
    wherein generating the plurality of design architectures comprises generating a plurality of connections between the devices in an ensemble of the one or more ensembles, the plurality of connections comprising all possible connections between the devices in the ensemble.

2. The method of claim 1, wherein transforming the design space problem comprises:
    generating a block representation of the design space problem using a domain specific language.

3. The method of claim 1, wherein the design space problem comprises variables and constraints.

4. The method of claim 1, wherein the design space model comprises relationships of the combination of devices.

5. The method of claim 1, wherein the one or more ensembles are generated using a constraint satisfiability problem (CSP) solver.

6. The method of claim 1, wherein the plurality of design architectures are generated using a SAT solver.

7. The method of claim 1, wherein generating the plurality of design architectures further comprises:
    generating a plurality of connections between the devices in each ensemble of the one or more ensembles; and
    identifying connections of the plurality of connections that satisfy the design space problem.

8. The method of claim 1, wherein generating the plurality of design architectures comprises excluding a proscribed architecture pattern.

9. A computer implemented method for efficiently generating design architectures, the method comprising:
    receiving, by at least one processor, a first design space model;
    generating, by the at least one processor, a first plurality of ensembles from the first design space model;
    receiving, by the at least one processor, a second design space model;
    generating, by the at least one processor, a second plurality of ensembles from the second design space model;

generating, by the at least one processor, a third plurality of ensembles based on the first plurality of ensembles and the second plurality of ensembles; and generating, by a plurality of processors of the at least one processor operating in parallel, a plurality of first design architectures of a combination of devices from the third plurality of ensembles simultaneously, wherein generating the plurality of first design architectures comprises generating a plurality of connections between the devices in an ensemble of the third plurality of ensembles, the plurality of connections comprising all possible connections between the devices in the ensemble.

10. The method of claim 9, wherein the second design space model comprises one or more components from the first design space model.

11. The method of claim 9, wherein generating the third plurality of ensembles comprises:
generating, by the plurality of processors operating in parallel, a plurality of second design architectures from the second plurality of ensembles;
selecting one or more second design architectures from the plurality of second design architectures;
identifying one or more ensembles from the second plurality of ensembles that relate to the one or more second design architectures; and
excluding the one or more ensembles from the second plurality of ensembles from the first plurality of ensembles.

12. The method of claim 9, wherein generating the third plurality of ensembles comprises:
generating, by the plurality of processors operating in parallel, a plurality of second design architectures from the second plurality of ensembles;
selecting one or more second design architectures from the plurality of second design architectures;
identifying one or more ensembles from the second plurality of ensembles that relate to the one or more second design architectures; and
determining an overlap of the one or more ensembles from the second plurality of ensembles and the first plurality of ensembles.

13. The method of claim 9, wherein generating the plurality of design architectures from the third plurality of ensembles comprises:

generating a plurality of connections between one or more components in each ensemble of the third plurality of ensembles; and
identifying connections of the plurality of connections that satisfy the first design space problem.

14. The method of claim 13, wherein the connections are identified by a SAT solver.

15. The method of claim 9, wherein the first design problem comprises a mathematically constrained problem.

16. The method of claim 15, wherein the first plurality of ensembles is generated using a constraint satisfiability problem (CSP) solver.

17. An apparatus comprising:
at least one processor; and
at least one memory including computer program code for one or more programs, the at least one memory configured to store the computer program code configured to, with the at least one processor, cause the apparatus to at least perform:
identify a design space problem stored in the at least one memory;
transform the design space problem into a design space model, the design space model representing a combination of devices;
generate one or more ensembles from the design space model; and
generate a plurality of design architectures of the combination of devices from the one or more ensembles,
wherein the plurality of design architectures are generated simultaneously by a plurality of processors of the at least one processor operating in parallel, and
wherein the generation of the plurality of design architectures comprises generation of a plurality of connections between the devices in an ensemble of the one or more ensembles, the plurality of connections comprising all possible connections between the devices in the ensemble.

18. The apparatus of claim 17 further comprises at least one constraint satisfiability problem (CSP) solver, wherein the at least one CSP solver is configured to generate the one or more ensembles from the design space model.

19. The apparatus of claim 17, further comprises at least one SAT solver, wherein the at least one SAT solver is configured to generate the plurality of design architectures from the one or more ensembles.

* * * * *